(12) United States Patent
Son

(10) Patent No.: US 6,760,534 B1
(45) Date of Patent: Jul. 6, 2004

(54) FIBER SCOPE AND CLEANING TOOL

(76) Inventor: Randall L. Son, 1310 Esplanade #311, Redondo Beach, CA (US) 90277

( * ) Notice: Subject to any disclaimer, the term of this patent is extended or adjusted under 35 U.S.C. 154(b) by 106 days.

(21) Appl. No.: 10/165,339

(22) Filed: Jun. 10, 2002

(51) Int. Cl.[7] ............................. G02B 6/38; G02B 6/00
(52) U.S. Cl. ........................... 385/147; 385/56; 385/75
(58) Field of Search ............................ 385/56, 75, 147

(56) References Cited

U.S. PATENT DOCUMENTS

| | | | |
|---|---|---|---|
| 5,056,185 A | | 10/1991 | Schotter |
| 5,117,528 A | * | 6/1992 | Kanayama et al. ........ 15/210.1 |
| 5,125,980 A | | 6/1992 | Schotter |
| 5,220,703 A | * | 6/1993 | Kanayama et al. ........ 15/210.1 |
| 5,731,893 A | * | 3/1998 | Dominique .................. 359/379 |
| 5,922,141 A | | 7/1999 | Darsey |
| 6,412,987 B1 | * | 7/2002 | Horwitz et al. ................ 385/56 |
| 6,485,193 B1 | * | 11/2002 | Chandraiah et al. .......... 385/75 |
| 2003/0005942 A1 | * | 1/2003 | Johnson et al. ................ 134/1 |

* cited by examiner

Primary Examiner—John D. Lee
Assistant Examiner—Tina M Lin
(74) Attorney, Agent, or Firm—Richard L. Mikesell

(57) ABSTRACT

A fiber scope and cleaning tool including a hand-held housing having a magnification and viewing system. A fiber inlet through the housing is used to insert a fiber into the viewing system. A fiber cleaning mechanism, including a strip of cleaning fabric spooled between rollers, is associated with the housing for cleaning the fiber.

7 Claims, 1 Drawing Sheet

FIBER SCOPE AND CLEANING TOOL

BACKGROUND OF THE INVENTION

The present invention generally relates to cleaning devices for optical fibers. In particular, the present invention relates to a tool for viewing optical fibers, and cleaning the optical fibers when necessary.

Optical fibers are being widely used today for telecommunications applications such as for telephone and data transmission lines. They offer excellent transmission rates and large bandwidths, generally at a lower cost and at a significantly smaller size than old, conventional copper wire transmission lines. Additionally, the quality of voice and data transmissions using optical fibers is significantly greater, with much lower signal losses, than with copper wire. Accordingly, the use of applicable fibers enables a greater volume of telephone and data transmissions with potentially significantly less expense but with greater clarity and speed.

When building fiber optic networks, it is required that the end of each fiber be checked for dirt, smudges, etc. Technicians use a fiber scope that magnifies the end of the fiber to look for dirt, scratches, etc. If the fiber is dirty, the technician removes the fiber from the fiber scope and cleans the end of the fiber with a small plastic device containing a cleaning cloth. The cleaning device is then put down and the scope used once again to check the fiber. This process is repeated until the end of the fiber is clean. The process of using two devices to check and clean the ends of fibers has been found to be very tedious. Given the fact that technicians often install several hundred or even thousands of fibers each day, the use of two devices to perform these functions significantly increases the time to install the fibers.

Accordingly, there is a need for a tool which can both examine and clean the end of the fibers. The present invention fulfills this need and provides other related advantages

SUMMARY OF THE INVENTION

The present invention relates to a fiber scope and cleaning tool. The tool generally comprises a hand-held housing having a magnification and viewing system disposed therein. A fiber is inserted through a fiber inlet of the housing into the viewing system. If the fiber end is dirty or scratched, a fiber cleaning mechanism associated with the housing is used to clean the fiber.

In a particularly preferred embodiment, the viewing system includes an eyepiece extending from the housing. A light connected to a power source is used to view the end of the fiber. A light switch may selectively power the light. A focus mechanism is included for bringing into focus the end of the fiber.

As there may be fibers of different diameter, the inlet includes an adapter having multiple aperture inlets.

The cleaning mechanism includes a strip of cleaning fabric that is spooled onto a roller and advanced to a second roller. A cover retractably overlies the cleaning fiber. Preferably, a switch is operatively connected to the cover and rollers to selectively retract the cover and advance the strip of fabric. The cleaning mechanism may comprise a disposable cartridge disposed within the housing having the spool of cleaning fabric extending between rollers and which can be disposed of and replaced within the cartridge.

Other features and advantages of the present invention will become apparent from the following more detailed description, taken in conjunction with the accompanying drawings, which illustrate, by way of example, the principles of the invention.

BRIEF DESCRIPTION OF THE DRAWINGS

The accompanying drawings illustrate the invention. In such drawings.

DETAILED DESCRIPTION OF THE PREFERRED EMBODIMENT

Figure 1:
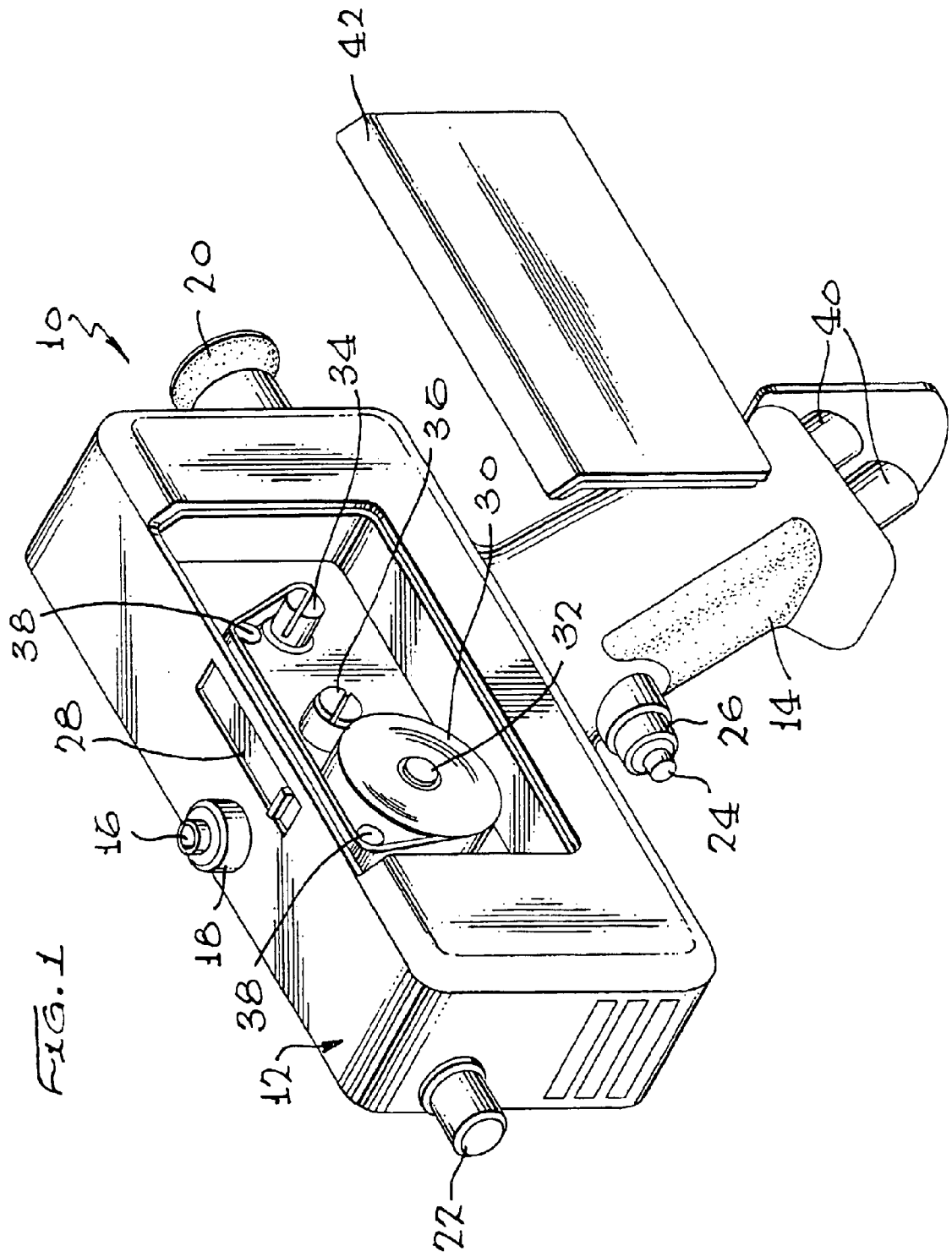
FIG. 1 is a partially exploded perspective view of a fiber scope and cleaning tool embodying the present invention.

As shown in the accompanying drawing for purposes of illustration, the present invention resides in a fiber scope and cleaning tool 10. The tool 10 includes a hand-held housing 12 having grip 14 extending downwardly therefrom so as to be easily held by a technician. The housing 12 is preferably comprised of durable material, such as shatter resistant plastic, as the tool 10 occasionally is dropped in operation in the field.

An end of an optic fiber is put into an inlet 16, which preferably includes an adapter 18 having at least two different size apertures alignable with the inlet 16 for the insertion of optic fibers of different diameter. Preferably, the adapter 18 includes apertures of 1.25 and 2.50 millimeters. The fiber is inserted into the housing 12 until it is within a magnification and viewing system within the housing 12. The magnification and viewing system includes an eye piece 20 extending from one end of the housing 12, and a focus knob 22 extending from the housing 12. A light switch 24 is depressed to illuminate the end of the fiber, and the magnification system is brought into focus using focus knob 22. The optic fiber is magnified several times, typically ten to thirty times normal. If the end of the fiber is clean and free of scratches, it is removed and installed in normal fashion.

However, if the end of the fiber requires cleaning, another switch 26 is depressed to open a retractable cover 28 that overlies a spool of cleaning fabric 30. The fabric 30 is spooled between two rollers 32 and 34 so that the cleaning fabric 30 may be advanced after use. A screw 36 or springloaded apparatus may be used to hold the spool of fabric 30 onto the first roll 32. The cleaning fabric 30 is held taut between two guide members 38 so as to immediately underlie the retractable cover 28.

The end of the optic fiber is removed from the inlet 16, inserted through the open cover 28 and moved along the surface of the cleaning fabric 30. One or more fabric cleaning guides may be used which allow the fiber to be placed against the fabric 30 underneath and stroked back against the fabric, typically twice, once in each guide. The fiber is then reinserted through inlet 16 into the viewing system to ensure that the end of the fiber is in condition for installation.

In a particularly preferred embodiment, the trigger switch 26 not only opens the retractable cover 28, but also activates a motor or the like to automatically advance the spool of cleaning fabric 30 between the rollers 32 and 34. Thus, a clean section of cleaning fabric is provided each time the trigger 26 is depressed. A power source, such as the illustrated batteries 40 within the grip 14 power the light and motor.

The fiber cleaning mechanism 30–38 may be formed into a disposal cartridge, similar to a cassette tape, so that once the spool of cleaning fabric 30 is exhausted, the cartridge is removed from the housing 12, such as by opening housing cover 42 to expose the cartridge, and a new cartridge is inserted in its place with a fresh spool of cleaning fabric 30. In any event, the cleaning fabric 30 and spools 32 and 34 are typically disposable.

It will be appreciated by those skilled in the art that the tool 10 of the present invention will present an enormous time savings to an optical fiber technician as the process of utilizing two devices to examine and clean the optic fiber is incorporated into the tool 10 of the present invention, reducing the tedious procedure of putting down one device and utilizing another device sequentially.

Although several embodiments have been described in detail for purposes of illustration, various modifications may be made without departing from the scope and spirit of the invention. Accordingly, the invention is not to be limited, except as by the appended claims.

What is claimed is:

1. A fiber scope and cleaning tool, comprising:
   a hand-held housing;
   a magnification and viewing system disposed within the housing;
   a fiber inlet through the housing for insertion of a fiber into the viewing system; and
   a fiber cleaning mechanism associated with the housing, wherein the cleaning mechanism comprises a disposable cartridge disposed within the housing and having a spool of cleaning fabric extending between rollers.

2. A fiber scope and cleaning tool, comprising:
   a hand-held housing;
   a magnification and viewing system including an eye piece extending from the housing, a focus mechanism extending from the housing, a light within the housing, a light switch for selectively powering the light, and a power source for the light;
   a fiber inlet through the housing for insertion of a fiber into the viewing system; and
   a fiber cleaning mechanism associated with the housing and including a strip of cleaning fabric disposed within the housing and a retractable cover overlying the cleaning fabric.

3. The tool of claim 2, wherein the fiber inlet includes an adapter having multiple aperture inlets for accommodating fibers of different diameter.

4. The tool of claim 2, wherein the cleaning fabric strip is spooled onto a roller and advanced to a second roller.

5. The tool of claim 4, including a switch operably connected to the cover for selectively retracting the cover and advancing the strip of fabric.

6. The tool of claim 2, wherein the cleaning mechanism comprises a disposable cartridge disposed within the housing and having a spool of cleaning fabric extending between rollers.

7. A fiber scope and cleaning tool, comprising:
   a hand-held housing;
   a magnification and viewing system including an eye piece extending from the housing, a focus mechanism extending from the housing, a light within the housing, a light switch for selectively powering the light, and a power source for the light;
   a fiber inlet through the housing for insertion of a fiber into the viewing system, the inlet including an adapter having multiple aperture inlets for accommodating fibers of different diameter; and
   a fiber cleaning mechanism associated with the housing and including a strip of cleaning fabric spooled onto a roller and advanced to a second roller by a switch operably connected to the rollers, and a cover overlying the cleaning fabric and retracted by the switch as the cleaning fabric is advanced, wherein the cleaning mechanism comprises a disposable cartridge disposed within the housing and having a spool of cleaning fabric extending between rollers.

* * * * *